United States Patent Office 2,703,815
Patented Mar. 8, 1955

2,703,815

BIS-(SUBSTITUTED PHENYL)-THIOUREAS

Charles F. Huebner, Morristown, and Caesar R. Scholz, Summit, N. J., assignors to Ciba Pharmaceutical Products, Inc., Summit, N. J., a corporation of New Jersey No Drawing. Application May 28, 1951, Serial No. 228,748

1 Claim. (Cl. 260—552)

The present invention relates to bis-(substituted phenyl)-thioureas and, more particularly, to certain hereinafter-identified 1,3-bis-(p-alkoxyphenyl)-2-thioureas and 1,3-bis-(p-cycloalkoxyphenyl)-2-thioureas.

Despite intensive research for a long time by scientists for chemotherapeutic agents effective against tuberculosis, the achieved results leave much to be desired. A primary object of the present invention is the embodiment of group of new substances characterized by antitubercular activity and comprising compounds which, in comparison with known antituberculosis compounds, are considerably less toxic while at the same time being of enhanced activity.

This object, and others which will hereinafter appear, is realized by the bis-(p-substituted phenyl)-thioureas of the present invention, which thioureas correspond to the formula

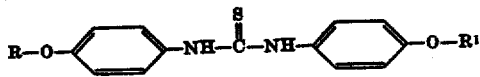

wherein each of R and R¹ represents a saturated hydrocarbon radical containing not more than 7 carbon atoms, the aggregate number of carbon atoms in R and R¹ being greater than 4 but not more than 14. The term "saturated hydrocarbon radical" is intended to designate such radicals wherein the carbon chain is saturated and straight, branched or cyclic. These compounds are characterized by marked antituberculosis activity and by concomitant low toxicity.

The new compounds, as precedingly defined, are obtained by reacting a p-R-O-aniline with a p-R-O-phenyl-isothiocyanate according to the reaction:

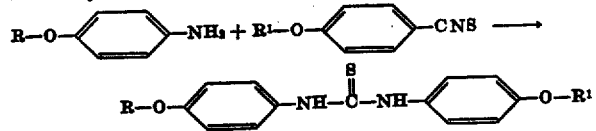

wherein R and R¹ have the previously-indicated significances. According to this method, R and R¹ may be identical or different.

The substituted phenylamines used as starting materials in the preparation of the compounds of the present invention may be prepared as follows:

An alkyl halide in slight molar excess (about 10%) is refluxed with the sodium or potassium salt of p-nitrophenol in 75% alcohol for about 10 hours. Most of the alcohol is distilled off and the crude nitro-ether is washed with aqueous alkali to remove unreacted p-nitro-phenol. After distillation in vacuo of the nitro-ether or recrystallization thereof, reduction is most conveniently carried out catalytically over Raney nickel in alcohol. The filtered alcohol solution of the substituted phenylamine is then ready for use directly in carrying out the aforesaid reaction.

Alternatively, p-acetaminophenol is converted to its potassium or sodium salt by stirring for a few minutes with one molar equivalent of the alkali in absolute methanol or ethanol. The alkyl halide (10% excess) is added and the mixture refluxed for 6 hours. Most of the alcohol is distilled off and the crystalline acetamino-ether precipitated with water. It is filtered, washed with dilute aqueous alkali and water. It is then hydrolyzed by refluxing with 1 to 2 molar equivalents of 20% sulfuric acid until the solution clears (about 30 minutes). An excess of alkali causes the substituted phenylamine to separate, whereafter it is purified by distillation in vacuo.

An alternative method of preparing the compounds of the present invention, in those cases where the alkoxy substituents are identical, is by reacting the appropriate substituted aniline with carbon disulfide or with thiophosgene. When carbon disulfide is employed, the reaction is carried out in a solvent such as alcohol, dioxane and the like, and may be hastened by employing a third substance such as hydrogen peroxide or a catalytic amount of sulfur, potassium ethyl xanthate or potassium hydroxide. When thiophosgene is employed, there is added to the mixture an alkaline substance such as an alkali metal hydroxide or carbonate to react with the hydrochloric acid which is liberated.

The new compounds are useful as therapeutics or as intermediates for the preparation of therapeutically active substances. They comprise compounds with antituberculosis activity which, in comparison with known compounds with antituberculosis activity such as the thiosemicarbazones, are considerably less toxic and of enhanced activity.

The invention is described in greater detail in the examples which follow and which are presented solely by way of illustration and not at all by way of limitation. In the said examples, parts by weight bear the same relation to parts by volume as do grams to milliliters. Temperatures are expressed in degrees centigrade.

Example 1

100 parts by weight of p-propoxyaniline are refluxed for 6 hours with 40 parts by volume of carbon disulfide in 300 parts by volume of ethanol and 5 parts by weight of potassium ethyl xanthate. The reaction mixture is then cooled and the formed 1,3-bis-(p-propoxyphenyl)-2-thiourea is filtered off, washed with a small amount of ethanol and water, and recrystallized from ethanol. The thus-obtained product:

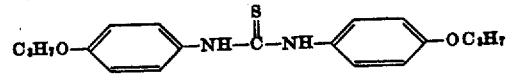

melts at 180–182° C. The product may also be recrystallized from acetic acid, chloroform, acetone or methyl ethyl ketone.

The 5 parts by weight of potassium ethyl xanthate may be replaced by 5 parts by weight of sulfur or, alternatively, by 1 part by weight of powdered potassium hydroxide.

By replacing the 100 parts by weight of p-propoxyaniline by the equivalent quantity of p-isopropoxyaniline and otherwise proceeding as described in the first paragraph of this example, the corresponding 1,3-bis-(p-isopropoxyphenyl)-2-thiourea:

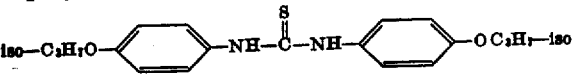

which melts at 144–144.5°, is obtained.

Example 2

100 parts by weight of p-sec-butoxyaniline are refluxed for 6 hours with 37 parts by volume of carbon disulfide in 300 parts by volume of ethanol and 5 parts by weight of potassium ethyl xanthate. The reaction mixture is then cooled and the formed 1,3-bis-(p-sec-butoxyphenyl)-2-thiourea is filtered off, washed with a small amount of ethanol and water, and recrystallized from ethanol. The thus-obtained product:

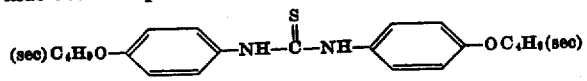

melts at 116°.

By replacing the p-sec-butoxyaniline by an equivalent quantity of p-n-butoxyaniline or p-isobutoxyaniline, and otherwise proceeding 1,3-bis-(p-n-butoxyphenyl)-2-thiourea:

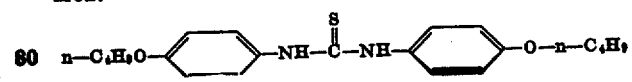

which melts at 164–165° or the 1,3-bis-(p-isobutoxyphenyl)-2-thiourea:

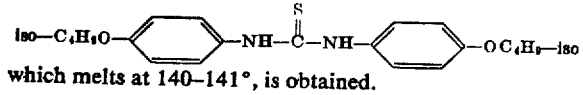

which melts at 140–141°, is obtained.

*Example 3*

100 parts by weight of p-n-amyloxyaniline are refluxed for 6 hours with 34 parts by volume of carbon disulfide, 300 parts by volume of ethanol and 5 parts by weight of potassium ethyl xanthate. The reaction mixture is then cooled and the formed 1,3-bis-(p-n-amyloxy-phenyl)-2-thiourea is filtered off, washed with a small amount of ethanol and water, and recrystallized from ethanol. The thus-obtained product:

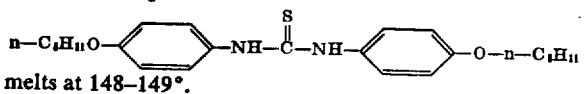

melts at 148–149°.

By replacing the p-n-amyloxyaniline by an equivalent quantity of p-isoamyloxyaniline, and otherwise proceeding as described in the preceding paragraph, the corresponding 1,3-bis-(p-isoamyloxyphenyl)-2-thiourea:

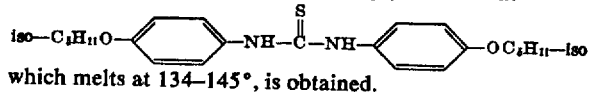

which melts at 134–145°, is obtained.

*Example 4*

100 parts by weight of p-n-hexyloxyaniline are refluxed for 6 hours with 31 parts by volume of carbon disulfide in 300 parts by volume of ethanol and 5 parts by weight of potassium ethyl xanthate. The reaction mixture is then cooled and the formed 1,3-bis-(p-n-hexyloxy-phenyl)-2-thiourea is filtered off, washed with a small amount of ethanol and water, and recrystallized from ethanol or acetone. The thus-obtained product:

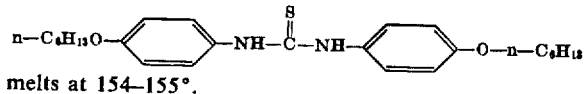

melts at 154–155°.

*Example 5*

100 parts by weight of p-n-heptyloxyaniline are refluxed for six hours with 29 parts by volume of carbon disulfide in 300 parts by volume of ethanol and 5 parts by weight of potassium ethyl xanthate. The reaction mixture is then cooled and the formed 1,3-bis-(p-heptyloxy-phenyl)-2-thiourea is filtered off, washed with a small amount of ethanol and water, and recrystallized from ethanol. The thus-obtained product:

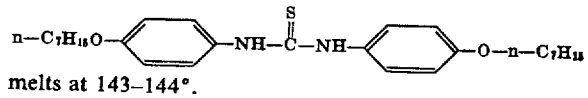

melts at 143–144°.

*Example 6*

100 parts by weight of p-cyclopentyloxyaniline are refluxed for 6 hours with 34 parts by volume of carbon disulfide in 300 parts by volume of ethanol and 5 parts by weight of potassium ethyl xanthate. The reaction mixture is then cooled and the formed 1,3-bis-(p-cyclopentyloxy-phenyl)-2-thiourea is filtered off, washed with a small amount of ethanol and water, and recrystallized from ethanol. The thus-obtained product:

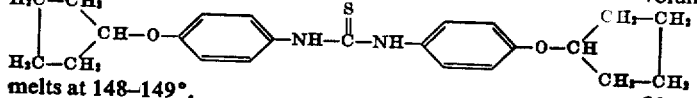

melts at 148–149°.

By replacing the p-cyclopentyloxyaniline by an equivalent quantity of p-cyclohexyloxyaniline, and otherwise proceeding as described in the preceding paragraph, the corresponding 1,3-bis-(p-cyclohexyloxyphenyl)-2-thiourea:

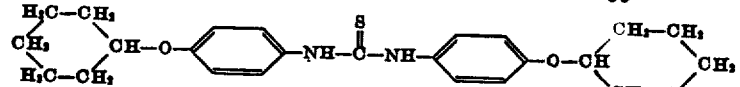

which melts at 142–145°, is obtained.

In each of the preceding Examples 2 to 6, inclusive, the product may also be recrystallized from acetic acid, chloroform, acetone or methyl ethyl ketone. Moreover, the potassium ethyl xanthate may be replaced by a corresponding quantity of sulfur or powdered potassium hydroxide.

*Example 7*

10 parts by weight of p-propoxyaniline are shaken at room temperature in 50 parts by volume of water to which 2.05 parts by volume of carbon disulfide and 3 parts by volume of 30% hydrogen peroxide have been added. After 48 hours, the semi-crystalline mass is filtered, and the 1,3-bis-(p-propoxyphenyl)-2-thiourea thus obtained recrystallized from ethanol or chloroform. Melting point = 180–182°.

*Example 8*

A mixture of 100 parts by weight of p-butoxyaniline, 37 parts by weight of carbon disulfide, 5 parts by weight of sulfur, and 300 parts by volume of ethanol is refluxed for 6 hours. On cooling, the formed crude 1,3-bis-(p-butoxyphenyl)-2-thiourea is filtered off, taken up in hot chloroform, and the solution filtered to remove sulfur and then cooled. The thus-purified product melts at 164–165°.

*Example 9*

100 parts by weight of p-butoxyaniline and 35 parts by weight of thiophosgene in 1000 parts by volume of water are refluxed for two hours. The mixture is cooled and 64 parts by weight of anhydrous sodium carbonate added cautiously. The mixture is then refluxed for another hour, cooled, filtered and the obtained crystalline product recrystallized from ethanol or chloroform. The thus-obtained 1,3-bis-(p-butoxyphenyl)-2-thiourea melts at 164–165°.

*Example 10*

10 parts by weight of p-propoxyaniline in 20 parts by volume of ethanol are added with stirring to 11.9 parts by weight of p-phenetyl isothiocyanate in 20 parts by volume of hot ethanol, and the mixture refluxed for fifteen minutes. On cooling, the formed 1-(p-phenetyl)-3-(p-propoxyphenyl)-2-thiourea:

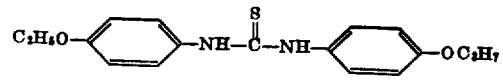

separates out. After recrystallization from ethanol, the melting point of the product is 171–172.5°.

By replacing the p-propoxyaniline by the equivalent quantity of p-isopropoxyaniline, and otherwise proceeding as set forth in the preceding paragraph, the corresponding 1-(p-phenetyl)-3-(p-isopropoxyphenyl)-2-thiourea:

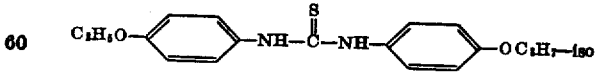

which melts at 171–172°, is obtained.

*Example 11*

10 parts by weight of p-sec-butoxyaniline in 20 parts by volume of ethanol are added with stirring to 10.9 parts by weight of p-phenetyl isothiocyanate in 20 parts by volume of hot ethanol, and the mixture refluxed for fifteen minutes. On cooling, the formed 1-(p-phenetyl)-3-(p-sec-butoxyphenyl)-2-thiourea:

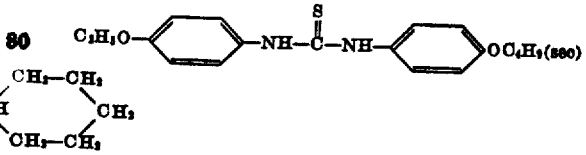

separates out. After recrystallization from ethanol, the melting point of the product is 152–154°.

By replacing the p-sec-butoxyaniline by an equivalent quantity of p-n-butoxyaniline or of p-isobutoxyaniline, and otherwise proceeding as described in the preceding paragraph, the corresponding 1-(p-phenetyl)-3-(p-n-butoxyphenyl)-2-thiourea:

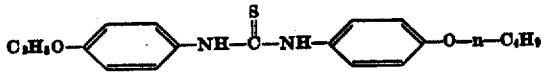

which melts at 161–164°, or 1-(p-phenetyl)-3-(p-iso-butoxyphenyl)-2-thiourea:

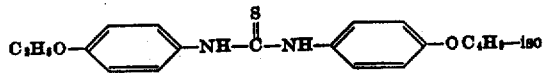

which melts at 168–169°, will be obtained.

By replacing the p-sec-butoxyaniline by an equivalent quantity of p-n-amyloxyaniline, and otherwise proceeding as set forth in the first paragraph of this example, the corresponding 1-(p-phenetyl)-3-(p-n-amyloxyphenyl)-2-thiourea:

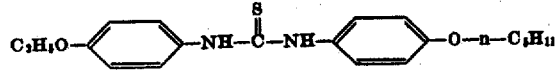

which melts at 151.5–153.5°, will be obtained.

By replacing the p-sec-butoxyaniline by an equivalent quantity of p-n-hexyloxyaniline, and otherwise proceeding as set forth in the first paragraph of this example, the corresponding 1-(p-phenetyl)-3-(p-n-hexyloxyphenyl)-2-thiourea:

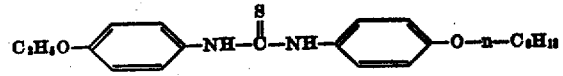

which melts at 153–154°, will be obtained.

By replacing the p-sec-butoxyaniline by an equivalent quantity of p-n-heptyloxyaniline, and otherwise proceeding as set forth in the first paragraph of this example, the corresponding 1-(p-phenetyl)-3-(p-n-heptyloxyphenyl)-2-thiourea:

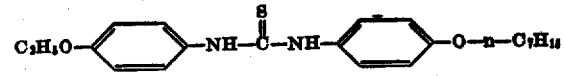

which melts at 143–144°, will be obtained.

*Example 12*

10 parts by weight of p-cyclopentyloxyaniline in 20 parts by volume of ethanol are added with stirring to 10 parts by weight of p-phenetyl isothiocyanate, and the mixture refluxed for fifteen minutes. On cooling, the formed 1-(p-phenetyl)-3-(p-cyclopentyloxyphenyl)-2-thiourea:

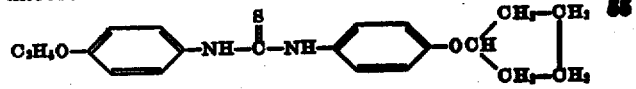

separates out. After recrystallization from ethanol, the product melts at 166.5–167.5°.

By replacing the p-cyclopentyloxyaniline by the equivalent amount of p-cyclohexylaniline, and otherwise proceeding as set forth in the preceding paragraph, the corresponding 1-(p-phenetyl)-3-(p-cyclohexyloxy-phenyl)-2-thiourea:

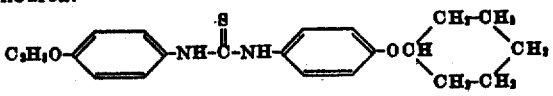

which melts at 129–130°, is obtained.

It will be understood that the p-alkoxyanilines employed in the foregoing examples may be replaced by other p-alkoxyanilines, and that the p-phenetyl isothiocyanate employed in Examples 10 to 12 inclusive may be replaced by other p-alkoxy isothiocyanates, provided only that the stipulations hereinbefore set forth with regard to the number of carbon atoms in R and $R^1$ are met. In this way, and by otherwise proceeding according to the said examples, additional (p-substituted phenyl)-thioureas such, for example, as the 1-(p-propoxyphenyl)-3-(p-n-butoxyphenyl)-2-thiourea (melting point 165–166°), the 1-(p-heptyloxyphenyl)-3-(p-phenetyl)-2-thiourea (melting point 143–144°) and the 1-(p-hexyloxyphenyl)-3-(p-phenetyl)-2-thiourea (melting point 154–155°), etc. are obtained.

Having thus disclosed the invention, what is claimed is: 1-(p-phenetyl)-3-(p-isobutoxyphenyl)-2-thiourea.

References Cited in the file of this patent

UNITED STATES PATENTS

| | | |
|---|---|---|
| 605,977 | Seifert | June 21, 1898 |
| 2,263,730 | Hentrich et al. | Nov. 25, 1941 |

OTHER REFERENCES

Dienske: "Rec. Trav. Chim.," vol. 50 (1931), pp. 407–414.

Lange et al.: "J. Am. Chem. Soc.," vol. 48 (1926), pp. 1069–74.

Dyson et al.: "J. Chem. Soc." (London) (1924), vol. 125, pp. 1702–8.

Braun et al.: "Ber. deut. Chem.," vol. 45 (1912), pp. 2196–97.

Spiegel: "Ber. deut. Chem.," vol. 34 (1901), pp. 1937–47.

UNITED STATES PATENT OFFICE

CERTIFICATE OF CORRECTION

Patent No. 2,703,815　　　　　　　　　　　　　　　　March 8, 1955

Charles F. Huebner et al.

It is hereby certified that error appears in the printed specification of the above numbered patent requiring correction and that the said Letters Patent should read as corrected below.

Column 2, line 76, after "proceeding" insert -- as described in the preceding paragraph, the corresponding --;  column 3, line 30, for "134-145°" read -- 143-145° --;  lines 51 and 52, for "(p-heptyloxyphenyl)" r -- (p-n-heptyloxyphenyl) --;  column 4, line 54, for "otehrwise" read -- otherwise --;  column 6, line 6, for "-3(p-cyclohexyloxy-phenyl)" read -- -3-(p-cyclohexyloxy-phenyl) --.

Signed and sealed this 5th day of April, 1955.

(SEAL)
Attest:

E. J. MURRY
Attesting Officer

ROBERT C. WATSON
Commissioner of Patents